Figure 1:
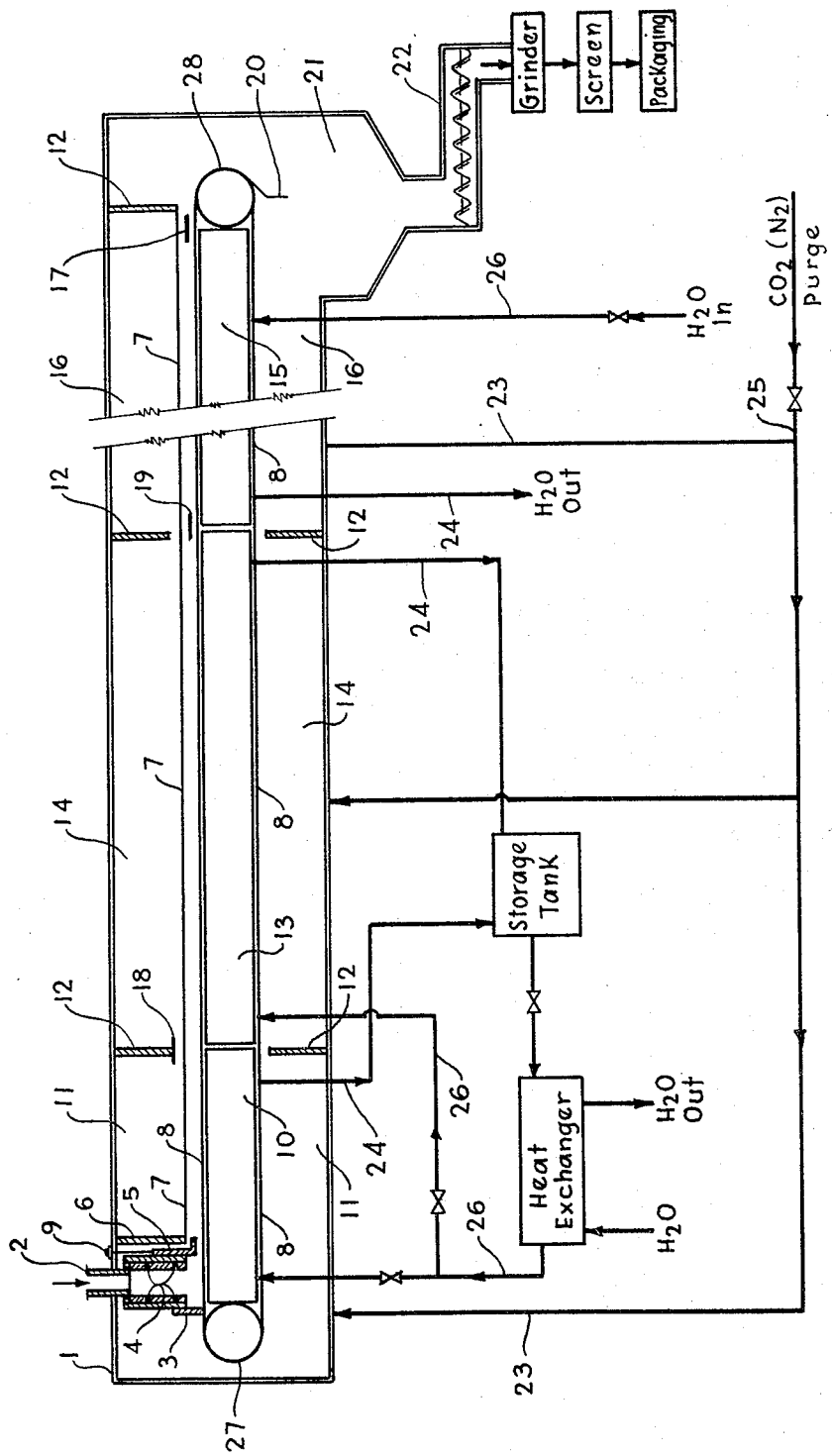

United States Patent Office 3,282,653
Patented Nov. 1, 1966

3,282,653
APPARATUS FOR THREE STAGE CONTROLLED COOLING AND SOLIDIFICATION OF PHOSPHOROUS PENTASULFIDE
Stephen Robota, North Tonawanda, N.Y., assignor to Hooker Chemical Corporation, Niagara Falls, N.Y., a corporation of New York
Filed Feb. 25, 1963, Ser. No. 260,747
4 Claims. (Cl. 23—273)

This invention relates to a process and apparatus for cooling molten materials, so as to effect solidification thereof, and more particularly it relates to a process and apparatus for cooling molten phosphorus pentasulfide so as to produce a solid product having a desired reactivity.

In the manufacture of phosphorus pentasulfide, phosphorus and sulfur in the molten state are reacted in approximately stoichiometric portions. Thereafter, the molten phosphorus pentasulfide is solidified by pouring it into molds, which are generally cone shaped, and allowing it to cool under essentially atmospheric conditions.

It has been found that the reactivity, i.e., the rate of reaction of phosphorus pentasulfide with alcohols, olefins and other reactants, is in direct proportion to the rate at which the molten phosphorus pentasulfide is cooled in forming the solid product. Thus, it has been determined that if in producing phosphorus pentasulfide, the cooling is rapid or quick, the resulting product has a high reactivity. Conversely, if the cooling is slow, the reactivity of the phosphorus pentasulfide is low. While it is true, that a phosphorus pentasulfide having a very low reactivity is generally not desirable in that too much time is required to carry out reactions using this material, it is also true that phosphorus pentasulfide having a very high rate of reactivity may be equally undesirable. For example, in some instances, reactions carried out using phosphorus pentasulfide having a very high reactivity take place so rapidly as to be explosive in nature. Accordingly, users of phosphorus pentasulfide often require a product having an intermediate reactivity, although the specific reactivity required will vary depending upon the use which is to be made of the phosphorus pentasulfide. Additionally, users of phosphorus pentasulfide generally demand that the product should have a uniform reactivity.

In the above described method of solidifying the molten phosphorus pentasulfide, wherein it is poured into a mold and allowed to cool under essentially atmospheric conditions, the phosphorus pentasulfide produced has a generally overall low rate of reactivity, although this reactivity is not always as uniform as may be desired. This is understandable inasmuch as the phosphorus pentasulfide on the outer periphery or portion of the mold is more quickly cooled than that in the innermost portion of the mold, with the result that the product is subjected to various rates of cooling, and, herefore, has varying rates of reactivity. Additionally, inasmuch as the overall rate of cooling of the phosphorus pentasulfide in this method is comparatively slow, it is not practicable to produce phosphorus pentasulfide having either a uniform reactivity or a sufficiently high reactivity for many uses by this method.

In an effort to overcome such difficulties, it has been proposed to effect solidification of molten phosphorus pentasulfide using a rotary flaker or a so-called "chill" wheel. Although in using this apparatus, the phosphorus pentasulfide obtained does have a substantially uniform reactivity, the cooling of the molten phosphorus pentasulfide is generally so rapid that the resulting product has an extremely high reactivity. Thus, in many reactions, the phosphorus pentasulfide so made reacts almost explosively, making it unsatisfactory.

Accordingly, up to the present time, there has been no process or cooling apparatus available with which it is possible to produce phosphorus pentasulfide having any of a variety of specifically desired uniform reactivities. In this regard, it is be noted that not only must the operation of such apparatus be sufficiently flexible so as to permit the production of phosphorus pentasulfide having different but uniform reactivities, but additionally, such apparatus, preferably should be capable of operating continuously rather than intermittently. Up to the present time, however, no cooling apparatus having these operating capabilities has been available.

It is, therefore, an object of the present invention to provide apparatus for cooling of a molten material, and in particular molten phosphorus pentasulfide, wherein the cooling and solidification of the molten material can be controlled so as to provide substantially any rate of cooling which is desired.

Another object of the present invention is to provide an apparatus for cooling molten phosphorus pentasulfide wherein at any one given cooling rate, the phosphorus pentasulfide product obtained will have a uniform rate of reactivity.

A further object of the present invention is to provide cooling apparatus which may be operated continuously and which is readily adaptable to automatic control.

Still another object of this invention is to provide a process whereby phosphorus pentasulfide having a desired uniform rate of reactivity can be produced.

These and other objects will become apparent to those skilled in the art from the description of the invention which follows.

Figure 2:
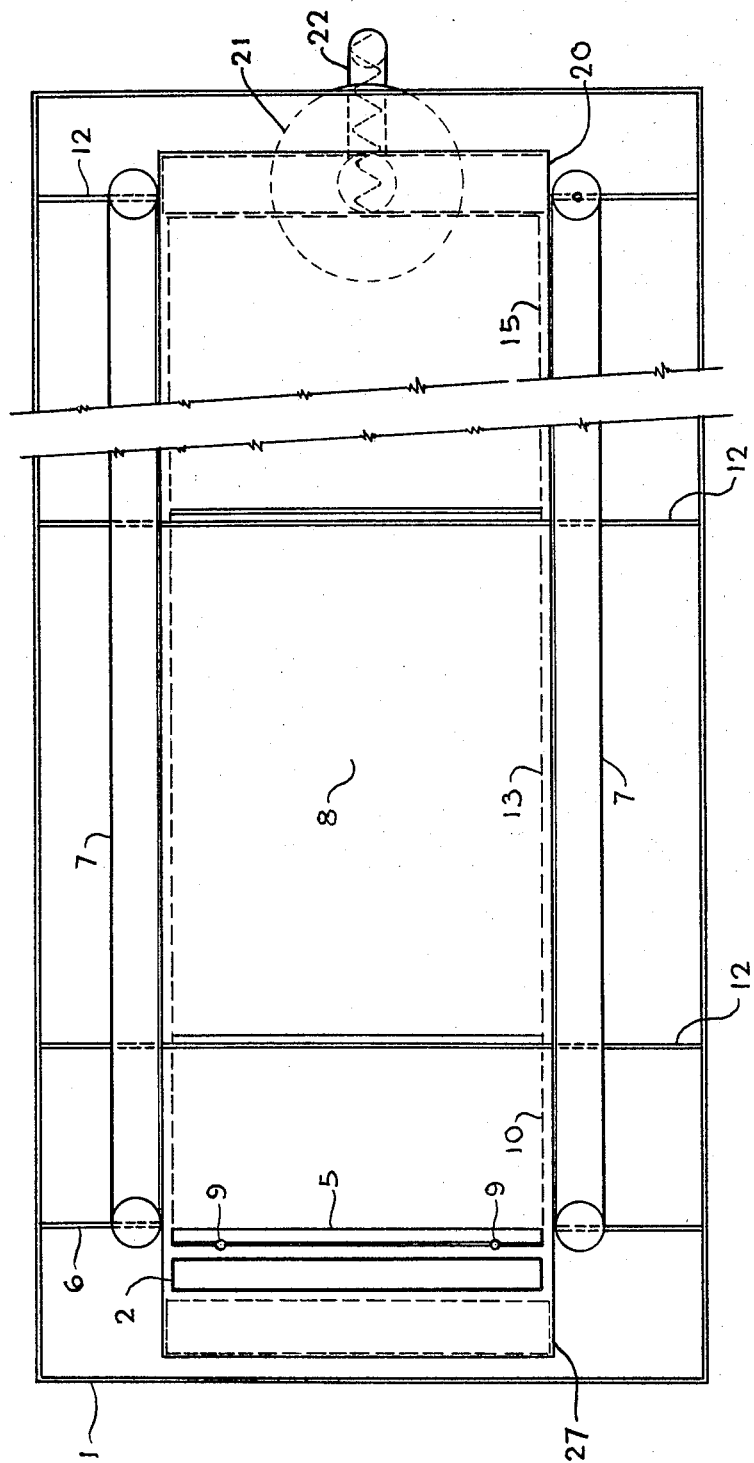
Figure 3:
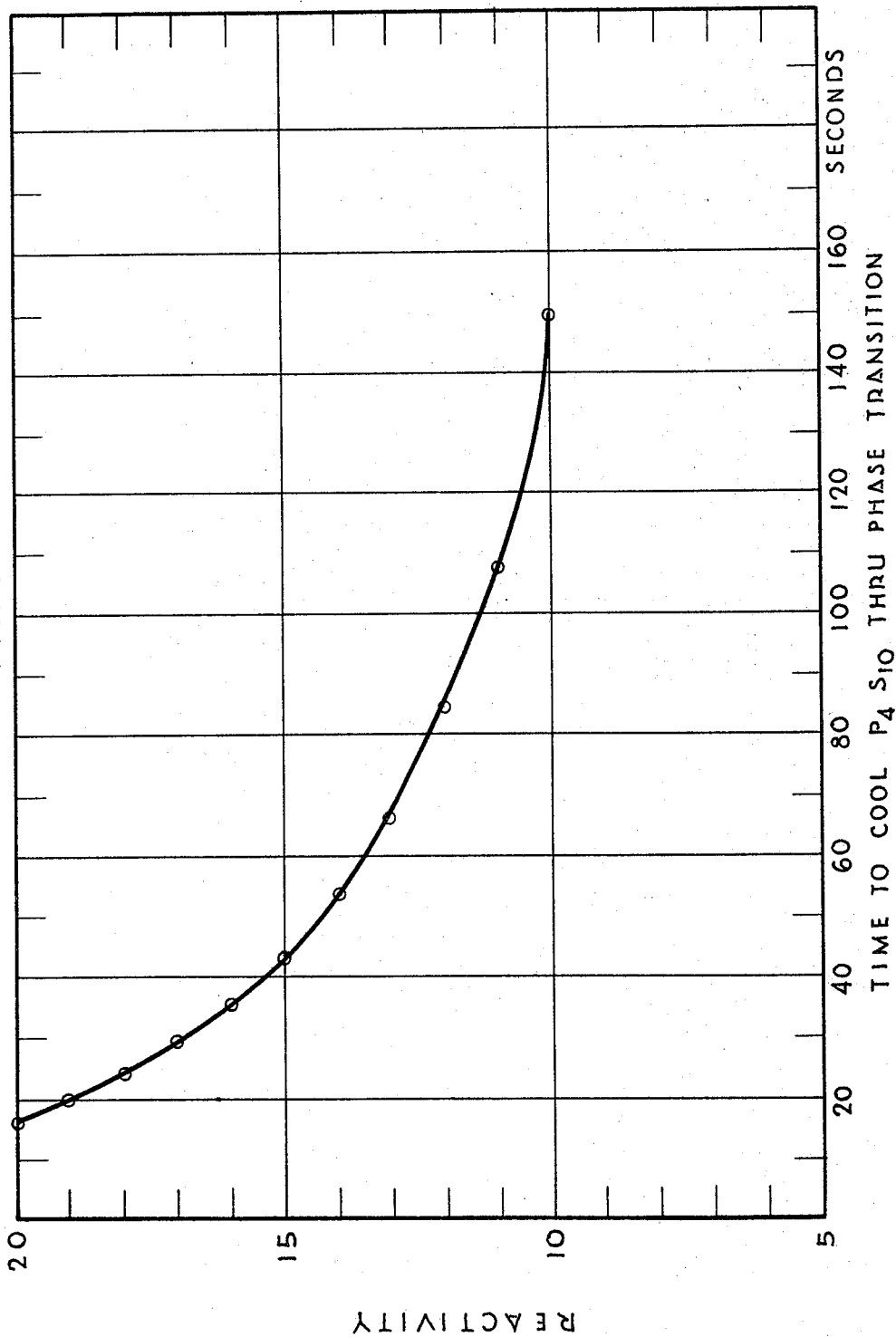

In the drawings which are attached hereto and form a part hereof, FIGURE 1 is a side view of a preferred embodiment of the apparatus of the present invention, partially in section; FIGURE 2 is a top view taken along the line 2—2 of FIGURE 1; and FIGURE 3 is a graph showing the relationship of rate of cooling phosphorus pentasulfide and reactivity.

In accordance with the present invention the subject apparatus includes a plurality of cooling zones arranged so as to effect sequential cooling of a molten material from the molten state to the solid state as it is passed through the cooling zones. The cooling zones are provided with cooling means and temperature sensing means. A conveyor means is provided to transport molten material sequentially through the cooling zones, the conveyor means and the molten material thereon being in heat transferring relation with the cooling means in each of the cooling zones. Means are provided for adding the molten material to the conveyor means as well as means for maintaining a gaseous medium, non-reactive with the molten material in each of the cooling zones. Preferably, the conveyor means is of the belt-type and there are, desirably, at least two cooling zones.

More specifically, the present apparatus includes an endless, moving belt which carries the phosphorus pentasulfide being treated. This belt moves sequentially through a series of cooling zones which effect cooling of the phosphorus pentasulfide from the molten state, as it is originally deposited on the moving belt, to a solid phosphorus pentasulfide having a specific reactivity. Preferably, the apparatus is provided with three separate cooling zones. In this embodiment, the phosphorus pentasulfide is cooled from the molten state, as it is obtained from the reaction of the molten phosphorus and sulfur, down to incipient solidification in the first zone. In the second zone, the phosphorus pentasulfide is cooled through the phase transition, at a predetermined rate so as to obtain the reactivity desired. In the third zone, the phosphorus pentasulfide is further cooled to substantially room temperature at a relatively fast rate so as to preserve the pre-set reactivity obtained in the second cooling zone. The following is exemplary of the cooling effected on the phosphorus pentasulfide in each of the three zones.

| Cooling zone: | Temperature Ranges ° C. |
|---|---|
| 1 | 400–275 |
| 2 | 275–265 |
| 3 | 365–60 (or lower) |

It will be appreciated, that instead of the three cooling zones as described above, the present apparatus may have only two cooling zones. In this instance, the phosphorus pentasulfide will be cooled through the phase transition in the first zone and, thereafter, further cooled to substantially room temperature in the second zone. It will further be appreciated that more than three separate cooling zones may be utilized in the present apparatus, as for example by providing more than one zone to cool the phosphorus pentasulfide from its initial molten state down to incipient solidification. Generally, more than one cooling zone will not be utilized in cooling the phosphorus pentasulfide from below the phase transition to room temperature since this cooling is preferably effected as rapidly as possible so as to preserve the pre-set reactivity obtained in cooling the material through phase transition as well as for reasons of economy.

Insofar as the reactivity of the final phosphorus pentasulfide product is concerned, the most critical portion of the cooling operation is that which takes place in the cooling zone wherein the phosphorus pentasulfide is cooled through phase transition. The length of time to effect the cooling of the phosphorus pentasulfide during this period, which cooling is generally from about 275 degrees centigrade to about 265 degrees centigrade is the controlling factor and determines the reactivity which the phosphorus pentasulfide product will have. For example, where the time for cooling through the transition phase is 20 seconds, the reactivity of the phosphorus pentasulfide will be nineteen. Where a cooling time of two and one-half minutes is used to bring the phosphorus pentasulfide through phase transition, the reactivity of the final product will be about 10. In regard to the reactivity of the phosphorus pentasulfide, it should be noted that this reactivity is a unit designation equal to the percent of phosphorus pentasulfide which reacts with ethanol in one minute. Accordingly, inasmuch as the cooling time for the phosphorus pentasulfide through phase transition is so important, it is preferred that the apparatus of the present invention provide one zone in which this portion and only this portion of the cooling operation is effected.

Any suitable medium may be used to effect the desired cooling in the cooling zones through which the moving belt passes. The cooling medium may be gaseous, for example, air; it may be liquid, as for example, water; or it may be solid, as for example, Dry Ice. Generally, because of its heat absorption capacity and the ease of handling and control, the liquid cooling mediums are preferred. In addition to water which, as indicated hereinabove, is the most common cooling medium, other cooling liquids may be used. Examples of these include the halogenated lower alkyl compounds, such as trichloroethylene, perchloroethylene, and the like, as well as halogenated aromatic compounds, such as the halogenated diphenyls.

As has been pointed out hereinabove, the cooling zones or sections of the present apparatus, although sequentially arranged, are each separate and independent. The reason for this, of course, is due to the different cooling ranges which are utilized in each of these zones as well as the different cooling rates which are effected in these ranges. Accordingly, it is important that each of these separate cooling zones has independent control means for maintaining both the cooling range in the zone as well as the rate at which this cooling is brought about. This is particularly important in the cooling zone wherein the phosphorus pentasulfide is cooled through the phase transition, inasmuch as it is this rate of cooling which is primarily responsible for the reactivity the final phosphorus pentasulfide product has. It has been found that in the cooling zone wherein the phosphorus pentasulfide is cooled through phase transition, the means for controlling the cooling rate should preferably be operative so that a cooling rate is effected substantially in accordance with the following equation:

$$lnR(0.56/\theta^{\frac{1}{2}})+2.0$$

where $R$=reactivity value and $\theta$=the time in minutes. In this manner the ultimate reactivity of the phosphorus pentasulfide product can be set to be best by regulating the rate at which cooling is effected in this zone.

The control of cooling and the rate of cooling in these zones may be effected using any convenient system or combination of systems. Such systems may include temperature sensing devices disposed within each of the zones. Such temperature sensing devices may be thermometers, pyrometers, thermocouples, or the like. Additionally, such systems may also provide means for controlling the rate of flow of the cooling fluids, means for controlling the temperature of the cooling fluid, as well as means for varying the linear speed of the moving belt. If desired, the temperature sensing devices may be operably connected with these latter control means in well known manner so that variations in the temperature of the phosphorus pentasulfide in the various cooling zones effects an automatic control of the cooling medium and the belt speed. Again, it should be pointed out that in the cooling zone wherein the phosphorus pentasulfide is cooled through the transition phase, the control system should be operative to give a rate of cooling as provided in the equation set forth hereinabove.

It will be appreciated that in processing the phosphorus pentasulfide in the apparatus of the present invention, it is important that the phosphorus pentasulfide be maintained out of contact with the atmosphere. When phosphorus pentasulfide, particularly at elevated temperatures and/or in the molten state, is processed in contact with the normal atmosphere, degradation of the phosphorus pentasulfide occurs, often with spontaneous combustion. Accordingly, it is an important aspect of the present apparatus that the phosphorus pentasulfide be maintained out of contact with the atmosphere during processing. This may be accomplished in various ways, as for example by enclosing the entire apparatus in a casing or shell. Means may also be provided wherein a non-oxidizing gas, such as carbon dioxide and/or nitrogen, is introduced into the casing shell so as to maintain the phosphorus pentasulfide, at all times, out of contact with the atmosphere. Inasmuch as the cooling zones of the present apparatus are substantially separate, it is preferred that the nonoxidizing gas be introduced into each of the individual cooling zones. In this manner, a substantially uniform nonoxidizing atmosphere is maintained throughout the entire apparatus, thus insuring uniformity of the phosphorus pentasulfide throughout the entire operation.

In addition to the moving, endless belt, the plurality of separate cooling zones, the separate cooling control systems, and the means for maintaining the entire apparatus out of contact with the atmosphere, the cooling apparatus of the present invention may also include a means for introducing the molten phosphorus pentasulfide into the apparatus, means for removing the solidified product from the belt and collecting it, as well as other devices which may be necessary to put the phosphorus pentasulfide product in its final, salable form. The cooling apparatus of the present invention, including the various ancillary devices, will be more easily understood by reference to the attached drawing.

As is shown in FIGURE 1 of the drawing, the cooling apparatus of the present invention is completely enclosed in a shell or casing 1. This casing, when purged with a gas which is non-reactive with phosphorus pentasulfide, such as carbon dioxide and/or nitrogen or the like, excludes air from the area immediately adjacent the cooling apparatus, and thus, prevents contact of the phosphorus pentasulfide being treated with the atmosphere. Within the casing 1, an endless, substantially flat belt 8 is disposed. This belt is adapted for movement in a continuous manner to transport phosphorus pentasulfide sequentially through a series of cooling zones or sections 11, 14, and 16 disposed adjacent to and along the length of the belt 8. The endless belt 8 is supported by and in operative contact with two pulley members 27 and 28, one of which is a driven pulley and the other of which is a driving pulley to which power is transmitted by any suitable prime mover (not shown). This prime mover is preferably of the variable speed drive type so that the linear speed of the endless belt 8 can be easily varied. While the belt 8 and pulleys 27 and 28 are shown as being disposed entirely within the casing 1, it is obvious that these pulleys and a part of the belt may be located outside of the casing if desired.

The interior of the casing 1 is divided into three sections 11, 14 and 16, by the baffles 12. These baffles are so positioned within the casing as to substantially isolate the zones 11, 14 and 16 from each other. While it is generally not practical to completely isolate these zones from each other inasmuch as the endless belt 8 must move, uninterruptedly, through the three zones, the openings in the baffles 12 to permit the passage of the endless belt from one zone to the other are preferably maintained at a minimum. In this manner, transfer of heat from one zone to another is substantially eliminated, thus making it possible more closely to control the rate of cooling in each of the three zones.

Within each of the cooling sections 11, 14 and 16 are disposed tanks or containers 10, 13 and 15, which contain cooling liquid. Each of these tanks is provided with suitable inlet means 26 for introducing the cooling liquid into the tank and outlet means 24 for removing the liquid from the tank. Additionally, suitable valves are provided to control the flow of the cooling liquid through the tanks, as well as a heat exchanger to control the temperature of the cooling liquid. The cooling tanks 10, 13 and 15 are disposed, respectively, in sections 11, 14 and 16, so as to be in cooling contact with the undersurface of the endless belt 8. As illustrated in the drawing, the cooling tanks are open at the top so that the moving belt 8 forms a cover for these tanks. Alternatively, however, a cover plate of a heat conductive material may be provided on each of the tanks, as for example a plate of graphite. The use of such a heat conductive cover plate may be used where it is desired to reduce the friction between the moving belt 8 and the tops of the tanks. Such cover plates are not, however, essential to the operation of the present apparatus.

Temperature sensing devices such as pyrometers, indicated generally in the drawing at 17, 18 and 19, are positioned adjacent to the exit end of each of the cooling sections 11, 14 and 16. These temperature sensing devices may be operatively connected with a temperature indicator located externally of the casing 1. In this manner, observation of the temperatures in each of the cooling zones may be made and necessary manual adjustments to the valves in the cooling liquid inlets 26 may be made so as to regulate the temperature in the cooling zones. Alternatively, the temperature sensing devices may be connected to the valves in the cooling liquid inlets 26 through suitable automatic control devices, well known in the art. In this manner, regulation of the flow of the cooling liquid into the tanks 10, 13 and 15 will be made automatically depending upon changing temperature conditions in each of the cooling zones. Additionally, the temperature sensing devices may be connected, through automatic control means, to the variable speed drive of the endless belt 8, thus making it possible automatically to vary the speed of the belt depending upon changes in the temperatures within the cooling zone. In this manner, the rate of cooling of the molten phosphorus pentasulfide, particularly in the second cooling zone 14, is maintained substantially constant so that a phosphorus pentasulfide product having a specific uniform reactivity is produced. In this regard, it is to be noted, as has been pointed out hereinabove, that the cooling apparatus and its control means in the second cooling zone are such as to effect a rate of cooling substantially as provided in the following equation:

$$lnR = (0.56/\theta^{1/2}) + 2.0$$

where $R$=reactivity value and $\theta$=time in minutes.

In the first cooling zone 11 means are provided for introducing the molten phosphorus pentasulfide into the apparatus, maintaining the phosphorus pentasulfide in the molten state and distributing the molten phosphorus pentasulfide on the moving endless belt 8. The phosphorus pentasulfide feedline is shown in the drawing as 2, and is surrounded at its discharge end by a suitable heater 4. This heater maintains the phosphorus pentasulfide in the molten state until it is deposited on the belt 8 and may be of any suitable type, such as an electrical heater or a hot liquid heater. A backing plate 3 is provided which extends across the entire width of the belt 8 so as to retain the molten phosphorus pentasulfide on the belt. Additionally, a gauging bar 5 is provided to regulate the thickness of the layer of molten phosphorus pentasulfide deposited on the moving belt 8. This gauging bar may be adjusted from outside of the casing 1 by means of the adjusting screw 9.

Side pieces 7 are provided to aid in retaining the molten phosphorus pentasulfide on the belt 8 until solidification of the phosphorus pentasulfide has taken place. These side pieces may be stationary strips of metal mounted on the support member 6 and the last baffle 12 and positioned at the outside edge of the belt 8. Preferably, however, as shown in the drawing, these side pieces are endless metal belts which pass around idler pulleys mounted on the support member 6 and driving pulleys mounted on the last baffle 12 so that the side pieces 7 may be moved at approximately the same linear rate of speed as the belt 8. In this manner breaking away of the layer of molten phosphorus pentasulfide from the side edges of the belt is prevented and the phosphorus pentasulfide layer is maintained at a substantially uniform thickness over the entire belt.

At the discharge end of the moving belt 8, adjacent zone 16, a scraper or doctor blade 20 may be provided to aid in removing the solid phosphorus pentasulfide from the belt. The casing 1, at the discharge end of the belt 8 is formed into a hopper portion 21 into which the solid phosphorus pentasulfide is discharged from the belt. The solid phosphorus pentasulfide is removed from the hopper portion 21 by any suitable means, as for example by the screw conveyor 22 which moves the solid phosphorus pentasulfide to suitable grinding, screening and packaging operations.

A purge system, indicated generally at 25, is provided so as to introduce a nonreactive gas into the interior of the casing 1 which surrounds the moving belt 8. This gas may be any gas which does not react with the phosphorus pentasulfide under the conditions which exist in the apparatus, suitable gases being carbon dioxide and/or nitrogen. Three separate gas inlet lines, 23, are provided so that the purge gas is introduced into each of the three cooling zones, 11, 14 and 16. In this manner, the phosphorus pentasulfide is maintained out of contact with air and a substantially constant atmosphere of nonreactive gases is provided in each of the three cooling sections.

In actual operation of the apparatus of the present invention, molten phosphorus pentasulfide at a temperature of about 400 degrees centigrade is introduced through the inlet pipe 2 into the first cooling zone 11 of the apparatus. The gauging bar 5 is adjusted so as to provide a phosphorus pentasulfide layer having a desired thickness, as for example about 0.33 inch. The endless belt 8, is moving at a predetermined constant rate of speed, as for example about 6.28 feet per minute. In passing through the first cooling zone 11, the molten phosphorus pentasulfide is cooled from the initial temperature of about 400 degrees centigrade to a temperature of about 175 degrees centigrade. The rate at which the cooling liquid is introduced into the cooling tank 10 and the cooling zone 11 is regulated so as to provide this degree of cooling. From the cooling zone 11, the phosphorus pentasulfide, at a temperature of about 275 degrees centigrade passes continuously into and through the second cooling zone 14. Within this zone, the temperature of the phosphorus pentasulfide is reduced from about 275 degrees centigrade to about 265 degrees centigrade, which brings the phosphorus pentasulfide through phase transition. The introduction of the cooling liquid into the tank 13 in the second zone 14 is regulated so that at the preset linear speed of the moving belt 8 the time required to effect this cooling of the phosphorus pentasulfide through phase transition is two minutes and 30 seconds.

After passing through the second cooling zone, 14, the phosphorus pentasulfide is passed into and through the third cooling zone 16. In this zone, the temperature of the phosphorus pentasulfide is reduced from about 265 degrees centigrade to about room temperature, i.e., about 25 degrees centigrade. Once again, the introduction of cooling liquid into the tank 15 in the third cooling zone 16 is regulated so as to effect this desired cooling of the phosphorus pentasulfide in as rapid a time as possible. Preferably, this is done by introducing the cooling liquid countercurrently to the movement of the belt 8. The solidified phosphorus pentasulfide which is discharged from the belt into the hopper portion 21 of the apparatus is found to have a reactivity of about 10. In subsequent runs, by increasing linear speed of the moving belt as well as the rate of introduction of cooling liquid into the second cooling zone 14, different times for cooling the phosphorus pentasulfide through phase transition are obtained. In this manner, a phosphorus pentasulfide product having varying reactivities is produced. These reactivities and the time required to cool the phosphorus pentasulfide through phase transition are illustrated in the following table.

| Reactivity: | Time to Cool $P_4S_{10}$ through Phase Transition |
| --- | --- |
| 10 | 2 mins. 30 secs. |
| 11 | 1 min. 48 secs. |
| 12 | 1 min. 24 secs. |
| 13 | 1 min. 6 secs. |
| 14 | 54 secs. |
| 15 | 42 secs. |
| 16 | 35 secs. |
| 17 | 30 secs. |
| 18 | 24 secs. |
| 19 | 20 secs. |
| 20 | 18 secs. |

The relation of these reactivities and the cooling times are shown graphically in FIGURE 3 of the drawing.

While there have been described various embodiments of the invention, the methods and elements described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. An apparatus for cooling molten phosphorus pentasulfide which comprises, in combination, a substantially horizontal outer casing member, a substantially horizontal endless conveyor belt disposed within the casing member, substantially vertical baffle members disposed within the casing member and extending from the outer casing member to a region adjacent the conveyor belt so as to form three separate cooling zones within the casing member, said cooling zones being formed within the casing member so as to effect sequential cooling of phosphorus pentasulfide from the molten state to the solid state as it is passed through the zones, said conveyor belt being positioned so as to transport molten phosphorus pentasulfide deposited thereon sequentially through the three separate cooling zones, means for introducing molten phosphorus pentasulfide into the first of the cooling zones and depositing it on the conveyor belt, means for removing solid phosphorus pentasulfide from the last of the cooling zones, separate means for circulating cooling liquid through each of the cooling zones contiguous to and in heat-transfer relation with the conveyor belt, means for sensing the temperature of phosphorus pentasulfide within each cooling zone and means responsive thereto for controlling the rate at which the cooling liquid is circulated in each of said cooling zones respectively, said temperature sensing and control means operating to cool the molten phosphorus pentasulfide to incipient solidification in the first zone, through phase transition in the second zone, and from phase transition to a predetermined temperature below the phase transition temperature in the third zone, and means for introducing a gaseous medium, nonreactive with the phosphorus pentasulfide, into the casing member so as to form a nonreactive atmosphere in each of the three separate cooling zones.

2. An apparatus for cooling molten phosphorus pentasulfide which comprises, in combination, a substantially horizontal outer casing member, a substantially horizontal endless conveyor belt disposed within the casing member, substantially vertical baffle members disposed within the casing member and extending from the outer casing member to a region adjacent the conveyor belt so as to form three separate cooling zones within the casing member, said cooling zones being formed within the casing member arranged so as to effect sequential cooling of phosphorus pentasulfide from the molten state to the solid state as it is passed through the zones, said conveyor belt being positioned so as to transport molten phosphorus pentasulfide deposited thereon sequentially through the three separate cooling zones, means for introducing molten phosphorus pentasulfide into the first of the cooling zones and depositing it on the conveyor belt, means for removing solid phosphorus pentasulfide from the last of the cooling zones, separate means for circulating cooling liquid through each of the cooling zones contiguous to and in heat transfer relation with the conveyor belt, means for sensing the temperature of phosphorus pentasulfide within each cooling zone and means responsive thereto for controlling the rate at which the cooling liquid is circulated into each of said cooling zones respectively, said temperature sensing and control means operating to cool the molten phosphorus pentasulfide to incipient solification in the first zone, through phase transition in the second zone, and from phase transition to a predetermined temperature below the phase transition temperature in the third zone, the control means in the second zone further being operative to control the time of cooling substantially according to the equation:

$$lnR = 0.56/\theta^{1/2} + 2.0$$

where $R$=reactivity value and $\theta$=time in minutes, so as to impart a desired reactivity to the phosphorus pentasulfide, and means for introducing a gaseous medium, nonreactive with the phosphorus pentasulfide, into the casing member so as to form a nonreactive atmosphere in each of the three separate cooling zones.

3. The apparatus as claimed in claim 2 wherein the control means are operative to cool the molten phosphorus pentasulfide to a temperature of about 275 degrees centigrade in the first cooling zone, from a temperature of about 275 degrees centigrade to a temperature of about 265 degrees centigrade in the second cooling zone and from a temperature of about 265 degrees centigrade to a temperature not substantially in excess of about 60 degrees centigrade in the third cooling zone.

4. The apparatus as claimed in claim 3 wherein means are provided to retain the molten phosphorus pentasulfide on the conveyor belt and prevent it from flowing off of the belt before it has solidified.

References Cited by the Examiner

UNITED STATES PATENTS

| | | | |
|---|---|---|---|
| 2,569,128 | 9/1951 | Jones | 23—206 |
| 2,794,705 | 6/1957 | Hudson | 23—206 |
| 2,808,236 | 10/1957 | Dickinson | 23—273 |
| 2,902,719 | 9/1959 | Hindes et al. | 23—273 X |
| 3,023,086 | 2/1962 | Robota | 23—206 |
| 3,146,069 | 8/1964 | Robota | 23—206 |
| 3,183,062 | 5/1965 | Taylor | 23—206 |
| 3,205,041 | 9/1965 | Cremer | 23—206 |

FOREIGN PATENTS 241,459  11/1960  Australia.

NORMAN YUDKOFF, *Primary Examiner.*

S. EMERY, A. J. ADAMCIK, *Assistant Examiners.*

UNITED STATES PATENT OFFICE
CERTIFICATE OF CORRECTION

Patent No. 3,282,653                          November 1, 1966

Stephen Robota

It is hereby certified that error appears in the above numbered patent requiring correction and that the said Letters Patent should read as corrected below.

Column 4, line 10, for "$lnR(0.56/\theta^{1/2})+2.0$" read -- $lnR=(0.56/\theta^{1/2})+2.0$ --; column 9, lines 5 and 6, strike out "sulfide, and means for introducing a gaseous medium, to impart a desired reactivity to the phosphorus penta-" and insert instead -- to impart a desired reactivity to the phosphorus pentasulfide, and means for introducing a gaseous medium, --.

Signed and sealed this 7th day of November 1967.

(SEAL)
Attest:

EDWARD M. FLETCHER, JR.
Attesting Officer

EDWARD J. BRENNER
                                           Commissioner of Patents